US012650671B2

(12) United States Patent
Oka et al.

(10) Patent No.: US 12,650,671 B2
(45) Date of Patent: Jun. 9, 2026

(54) ABNORMAL IRREGULARITY CAUSE IDENTIFYING DEVICE, ABNORMAL IRREGULARITY CAUSE IDENTIFYING METHOD, AND ABNORMAL IRREGULARITY CAUSE IDENTIFYING PROGRAM

(71) Applicant: DAICEL CORPORATION, Osaka (JP)

(72) Inventors: Hiroki Oka, Tokyo (JP); Koichi Yamano, Tokyo (JP); Fumihiro Miyoshi, Tokyo (JP); Hidetoshi Kozono, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 596 days.

(21) Appl. No.: 17/927,602

(22) PCT Filed: May 25, 2021

(86) PCT No.: PCT/JP2021/019800
§ 371 (c)(1),
(2) Date: Nov. 23, 2022

(87) PCT Pub. No.: WO2021/241578
PCT Pub. Date: Dec. 2, 2021

(65) Prior Publication Data

US 2023/0229136 A1 Jul. 20, 2023

(30) Foreign Application Priority Data

May 29, 2020 (JP) ................................ 2020-095038

(51) Int. Cl.
*G05B 19/406* (2006.01)

(52) U.S. Cl.
CPC .. *G05B 19/406* (2013.01); *G05B 2219/34465* (2013.01)

(58) Field of Classification Search
CPC .................................................... G05B 19/406
(Continued)

(56) References Cited

U.S. PATENT DOCUMENTS

2012/0310597 A1* 12/2012 Uchiyama .......... G05B 23/0278 702/185
2019/0384275 A1 12/2019 Shida et al.
2021/0116331 A1* 4/2021 Kawai ................ G06F 16/2358

FOREIGN PATENT DOCUMENTS

JP 6-309584 A 11/1994
JP 2006-276924 A 10/2006
(Continued)

OTHER PUBLICATIONS

English machine translation of Japanese Office Action for Japanese Application No. 2022-526581, issued Dec. 3, 2024.
(Continued)

*Primary Examiner* — Mohammad Ali
*Assistant Examiner* — Joshua T Sanders
(74) *Attorney, Agent, or Firm* — Birch, Stewart, Kolasch & Birch, LLP

(57) ABSTRACT

An abnormal irregularity cause identifying device includes a process data acquisition unit that reads, from a storage device storing process data, the pieces of process data, an abnormality determination unit that calculates an abnormality degree representing an extent of an irregularity of process data of the pieces of process data read by the process data acquisition unit, and a cause diagnosis unit that obtains accuracy of a cause of the irregularity based on a proportion of process data having the abnormality degree calculated by the abnormality determination unit satisfying a predeter-
(Continued)

mined criterion to the plurality of types of pieces of process data, by using causal relation information defining a combination between the cause and the irregularity, which appears as an influence resulting from the cause, of each of the plurality of types of pieces of process data.

6 Claims, 18 Drawing Sheets

(58) Field of Classification Search
USPC .......................................................... 700/109
See application file for complete search history.

(56) References Cited

FOREIGN PATENT DOCUMENTS

| | | |
|---|---|---|
| JP | 2014-056598 A | 3/2014 |
| JP | 2018-109851 A | 7/2018 |
| JP | 2018-120343 A | 8/2018 |
| JP | 2019-16039 A | 1/2019 |
| JP | 2019-57164 A | 4/2019 |
| WO | WO 2017/109903 A1 | 6/2017 |
| WO | WO 2018/104985 A1 | 6/2018 |

OTHER PUBLICATIONS

Extended European Search Report for European Application No. 21814187.7, dated Jun. 17, 2024.

International Search Report for International Application No. PCT/JP2021/019800, dated Aug. 3, 2021, with English translation.

Written Opinion of the International Searching Authority for International Application No. PCT/JP2021/019800, dated Aug. 3, 2021, with English translation.

* cited by examiner

| SEQUENCE | STAGE | S/N | STEP | PRODUCT TYPE |
|---|---|---|---|---|
| #1 | PRETREATMENT | 001 | ST11 | F11 |
| #1 | PRECOOLING | 002 | ST12 | F12 |
| #1 | REACTION | 003 | ST13 | F13 |
| #1 | AGING | 004 | ST14 | F14 |
| #2 | PRETREATMENT | 001 | ST21 | F21 |
| ... | ... | ... | ... | ... |

FIG. 4

| TAG | SEQUENCE | STAGE | COLLECTION INTERVAL [s] |
|---|---|---|---|
| 001 | #1 | PRETREATMENT | 10 |
| 002 | #1 | PRETREATMENT | 10 |
| 003 | #1 | PRETREATMENT | 10 |
| 004 | #1 | PRETREATMENT | 10 |
| 005 | #1 | PRECOOLING | 10 |
| 006 | #1 | PRECOOLING | 10 |
| ... | ... | ... | ... |

FIG. 5

| SAMPLING INTERVAL | RESIDENCE TIME |
| --- | --- |
| ... | ... |

FIG. 7

| | | INFLUENCE | | | | | |
|---|---|---|---|---|---|---|---|
| SENSOR | | FLOW RATE | WATER CONTENT | CURRENT | TEMPERATURE 1 | TEMPERATURE 2 | … |
| TAG | | 001 | 002 | 003 | 004 | 005 | … |
| ASSUMED CAUSE | CAUSE (1) | DOWN | | | | DOWN | … |
| | CAUSE (2) | | UP | | UP | DOWN | … |
| | CAUSE (3) | | | UP | UP | DOWN | … |
| | CAUSE (4) | | | | UP | DOWN | … |
| | CAUSE (5) | | | | UP | DOWN | … |
| | CAUSE (6) | | | | UP | DOWN | … |
| | CAUSE (7) | | UP | DOWN | | … | … |
| | CAUSE (8) | UP | | DOWN | | … | … |
| | … | … | … | … | … | … | … |
| CALCULATION METHOD | | H | k | DTW | AE | glasso | … |
| EXTRACTION TIMING | | … | … | … | … | … | … |
| THRESHOLD VALUE | | … | … | … | … | … | … |
| … | | … | … | … | … | … | … |

FIG. 9

| CAUSE | ACTION 1 | ACTION 2 |
| --- | --- | --- |
| CAUSE (1) | ... | ... |
| CAUSE (2) | ... | ... |
| CAUSE (3) | ... | ... |
| CAUSE (4) | ... | ... |
| CAUSE (5) | ... | ... |
| CAUSE (6) | ... | ... |
| CAUSE (7) | ... | ... |
| CAUSE (8) | ... | ... |
| ... | ... | ... |

FIG. 17

ABNORMAL IRREGULARITY CAUSE IDENTIFYING DEVICE, ABNORMAL IRREGULARITY CAUSE IDENTIFYING METHOD, AND ABNORMAL IRREGULARITY CAUSE IDENTIFYING PROGRAM

CROSS REFERENCE TO RELATED APPLICATIONS

This application is the National Phase of PCT International Application No. PCT/JP2021/019800, filed on May 25, 2021, which claims priority under 35 U.S.C. 119 (a) to Patent Application No. 2020-095038, filed in Japan on May 29, 2020, all of which are hereby expressly incorporated by reference into the present application.

TECHNICAL FIELD

The present disclosure relates to an abnormal irregularity cause identifying device, an abnormal irregularity cause identifying method, and an abnormal irregularity cause identifying program.

BACKGROUND ART

In the related art, there are proposed technologies for estimating a cause of an abnormality by using operation data received from a plant. For example, there is proposed a technology in which weighting of an occurrence probability of a first abnormal event that occurred in the past is made greater than weighting of an occurrence probability of a second abnormal event that has not occurred to estimate a cause of a sign of an abnormality (Patent Document 1). There is also proposed a technology in which in a case where an abnormality of a process to be diagnosed is detected, a contribution rate indicating a proportion of contribution of a process variable indicating a state of the process to be diagnosed is estimated, and an event that may be a factor of the abnormality from among registration events defined in advance is estimated based on the contribution rate (Patent Document 2).

There is also proposed a technology in which a deviation index from a normal state of a process is calculated by using a plurality of submodels for predicting a state of the process, and a cause of an abnormal state occurring in the process is estimated based on a deviation index pattern set including deviation indexes calculated for respective submodels (Patent Document 3). Furthermore, there is proposed a technology in which a monitoring contribution degree with respect to a monitoring abnormality degree is calculated for each of a plurality of pieces of operation data constituting monitoring operation data, a diagnostic target data group including higher N pieces of operation data having a large monitoring contribution degree is extracted, a matching index between the diagnosis target data group and a diagnostic reference data group including higher M operation data having a large reference contribution degree included in reference operation data is calculated, and an abnormality of a plant is predicted based on pieces of the reference operation data having a matching index equal to or larger than a matching determination threshold (Patent Document 4).

PRIOR ART DOCUMENT

Patent Document

Patent Document 1: JP 2018-109851 A
Patent Document 2: JP 2018-120343 A
Patent Document 3: JP 2019-16039 A
Patent Document 4: JP 2019-57164 A

SUMMARY OF INVENTION

Technical Problem

In general, it is desirable to prevent abnormal irregularity to suppress an impact on safety, stability, quality of products, cost, and the like in a production facility. The present technology aims to improve the identification performance of a cause of abnormal irregularity in a production facility.

Solution to Problem

An abnormal irregularity cause identifying device includes a process data acquisition unit that reads, from a storage device storing a plurality of types of pieces of process data continuously output by a plurality of sensors included in a production facility, the pieces of process data, an abnormality determination unit that calculates an abnormality degree representing an extent of an irregularity of process data of the pieces of process data read by the process data acquisition unit, and a cause diagnosis unit that obtains accuracy of a cause of the irregularity based on a proportion of process data having the abnormality degree calculated by the abnormality determination unit satisfying a predetermined criterion to the plurality of types of pieces of process data, by using causal relation information defining a combination between the cause and the irregularity, which appears as an influence resulting from the cause, of each of the 15 plurality of types of pieces of process data.

With the accuracy described above, a likelihood of a cause assumed for an abnormal irregularity in a production facility can be found and thus it is possible to improve performance to identify the cause.

Furthermore, the cause diagnosis unit may multiply each of the plurality of types of pieces of process data by a coefficient in accordance with a type of the process data or a coefficient based on a magnitude of the abnormality degree to obtain the accuracy of the cause of the irregularity. By performing weighting depending on a type of the process data or a magnitude of the abnormality 30 degree, it is possible to calculate the accuracy of the cause of the irregularity more accurately.

In addition, an output control unit that makes an output device output, for the irregularity, a plurality of candidates of a possible cause of the irregularity and accuracy of the possible cause may be further provided. The output allows a user to recognize an abnormal irregularity or a sign thereof, candidates of an assumed cause, and the like and address the irregularity.

Note that the contents described in Solution to Problem can be combined as much as possible without departing from the problems and technical idea of the present disclosure. Furthermore, the contents of Solution to Problem can be provided as a system including a device, such as a computer, or a plurality of devices, a method performed by the computer, or a program executed by the computer. Note that a recording medium for storing the program may be provided.

Advantageous Effects of Invention

According to the disclosed technology, it is possible to improve the accuracy of identifying a cause of abnormal irregularity in a production facility.

BRIEF DESCRIPTION OF DRAWINGS

FIG. 4 is a diagram illustrating an example of a stage line definition table set in advance.

FIG. 5 is a diagram illustrating an example of a tag definition table set in advance.

FIG. 7 is a diagram illustrating an example of traceability information.

FIG. 9 is a diagram illustrating an example of information pre-registered in a knowledge base.

FIG. 17 is a diagram illustrating an example of an action table.

DESCRIPTION OF EMBODIMENTS

Hereinafter, an embodiment of an abnormal irregularity cause identifying device will be described with reference to the drawings.

Embodiment

Figure 1:
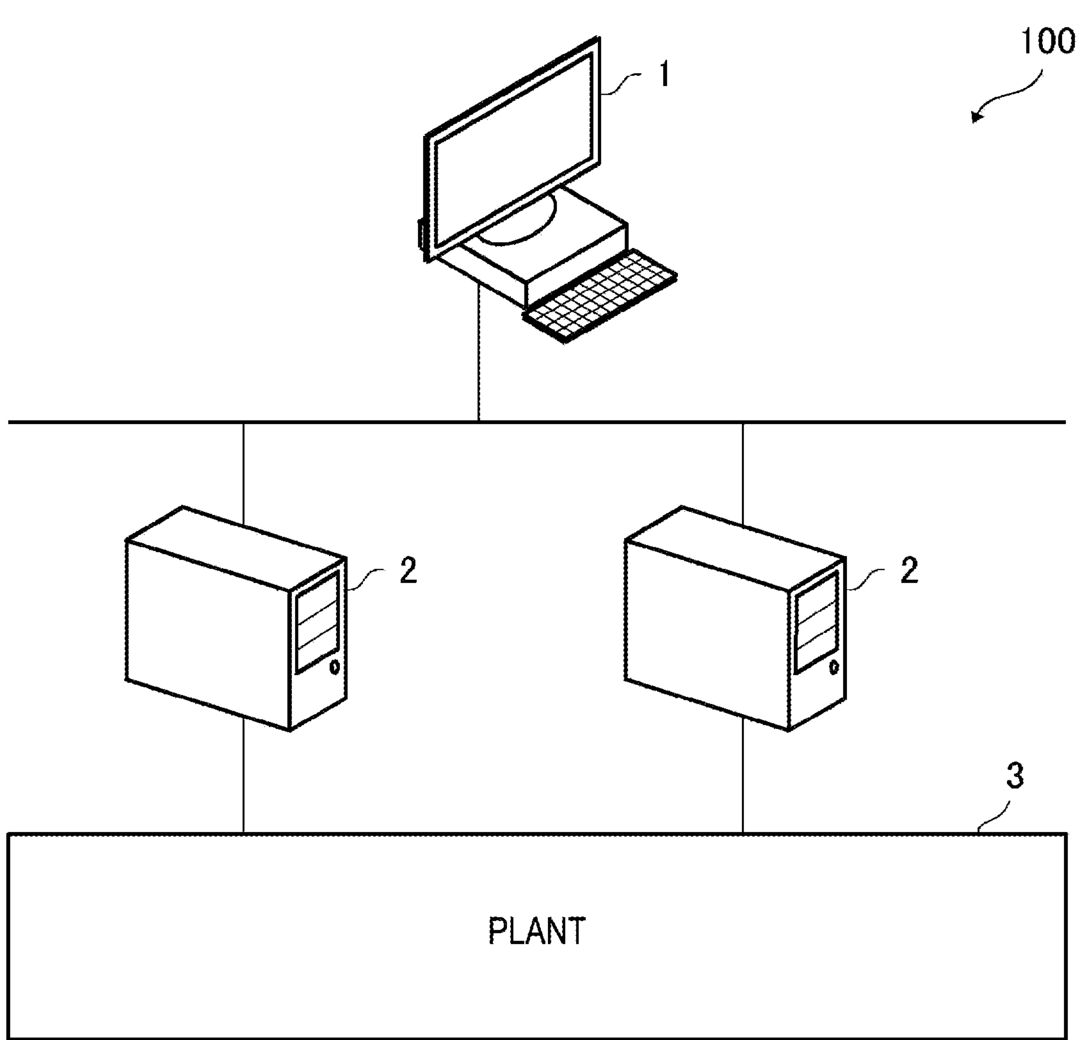
FIG. 1 is a diagram illustrating an example of a system according to a present embodiment.

FIG. 1 is diagram illustrating an example of a system according to the present embodiment. A system 100 includes an abnormal irregularity cause identifying device 1, control stations 2, and a plant 3. The system 100 is, for example, a Distributed Control System (DCS) and includes a plurality of the control stations 2. That is, a control system of the plant 3 is divided into a plurality of sections, and distributed control is performed by the control stations 2 for each of the control sections. The control station 2 is an existing facility in the DCS, receives state signals output from sensors or the like included in the plant 3, or outputs a control signal to the plant 3. Based on the control signal, actuators such as valves and other equipment included in the plant 3 are controlled.

The abnormal irregularity cause identifying device 1 acquires a state signal (process data) of the plant 3 via the control station 2. The process data includes the temperature, pressure, flow rate, and the like of a processing target that is a raw material or an intermediate product, and setting values for determining the operating conditions of the equipment included in the plant 3.

Furthermore, the abnormal irregularity cause identifying device 1 creates an abnormality detection model based on a knowledge base that stores a correspondence relationship between an assumed cause and an influence appearing as an abnormality, for example. For example, a model for identifying an abnormal irregularity, a sign thereof, and a cause thereof is created based on a technique, which is created based on the knowledge base, to detect a deviation from an acceptable range for change in process data. The abnormal irregularity cause identifying device 1 can detect occurrence of the abnormal irregularity or the sign thereof by using the model and the process data. Furthermore, the abnormal irregularity cause identifying device 1 may obtain, for example, a candidate for an operating condition for suppressing the abnormal irregularity based on a table that stores causes of the abnormal irregularity and actions for handling the causes and the identified cause and may propose the candidate to the user.

Figure 2:
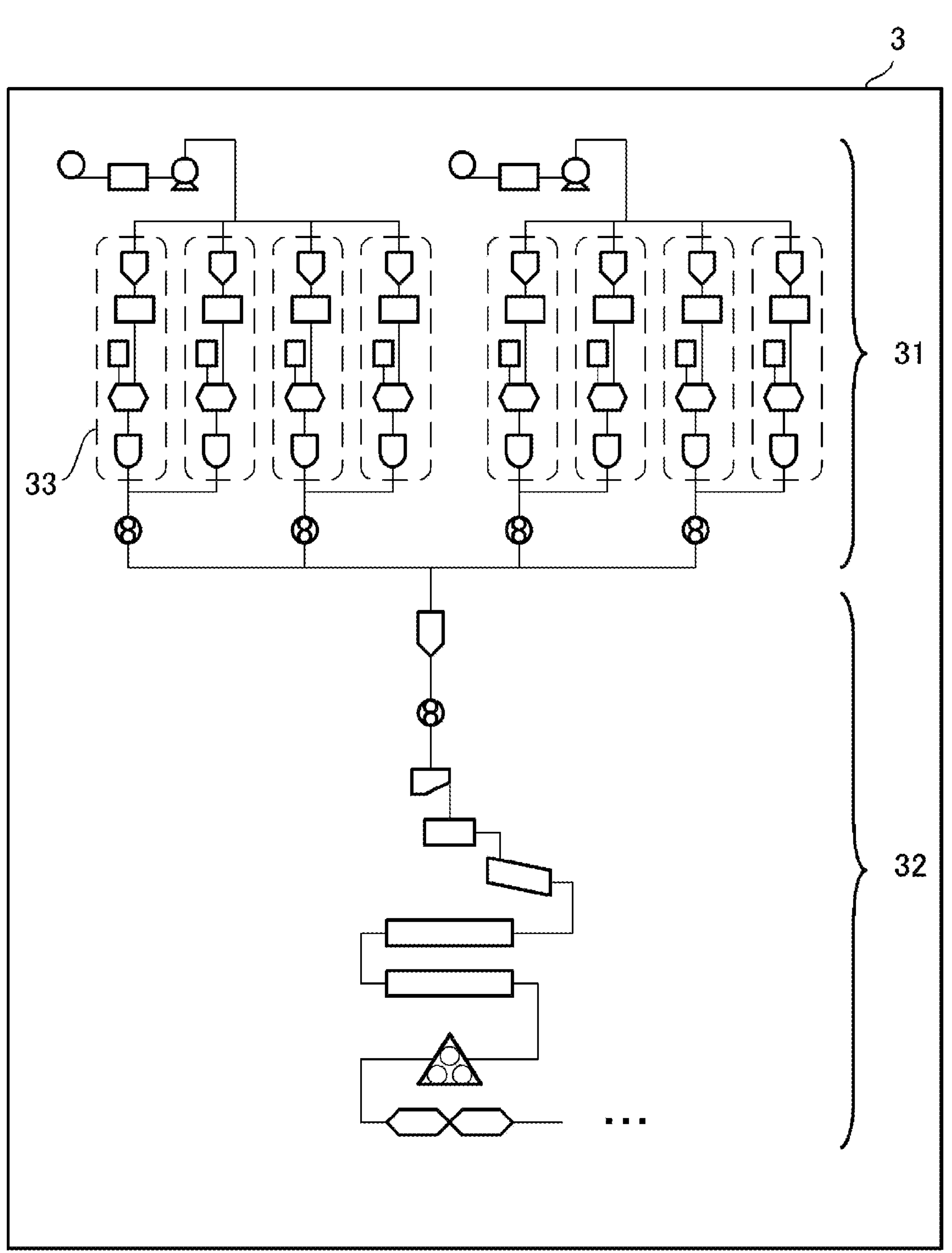
FIG. 2 is a schematic diagram illustrating an example of a process performed by equipment included in a plant.

FIG. 2 is a schematic diagram illustrating an example of a process performed by equipment included in a plant. In the present embodiment, the process can include a batch stage 31 and a continuous stage 32. In the batch stage 31, processing targets are sequentially processed on a transaction-to-transaction basis by using a predetermined transaction, and for example, processing operations such as receiving, holding, and emitting of a raw material with respect to each equipment are performed in order. In the continuous stage 32, successively introduced processing targets are continuously processed, and for example, processing such as receiving, holding, and emitting of a raw material are performed in parallel. Furthermore, the process can include a plurality of sequences 33 that perform the same processing in parallel.

The equipment for performing each processing includes, for example, a reactor, a distillation device, a heat exchanger, a compressor, a pump, a tank, and the like, and these are connected via pipes. Furthermore, sensors, valves, and the like are provided at predetermined positions of the equipment and the pipe. The sensor can include a thermometer, a flow meter, a pressure gauge, a level meter, a densitometer, and the like. Furthermore, the sensor monitors the operating state of each equipment and outputs a state signal. Furthermore, it is assumed that the sensor included in the plant 3 is attached with a "tag", which is identification information for identifying each of the sensors. That is, a type of process data can be identified based on the tag. The abnormal irregularity cause identifying device 1 and the control station 2 manage input/output signals to/from each equipment based on the tags.

Batch Stage

Figure 3:
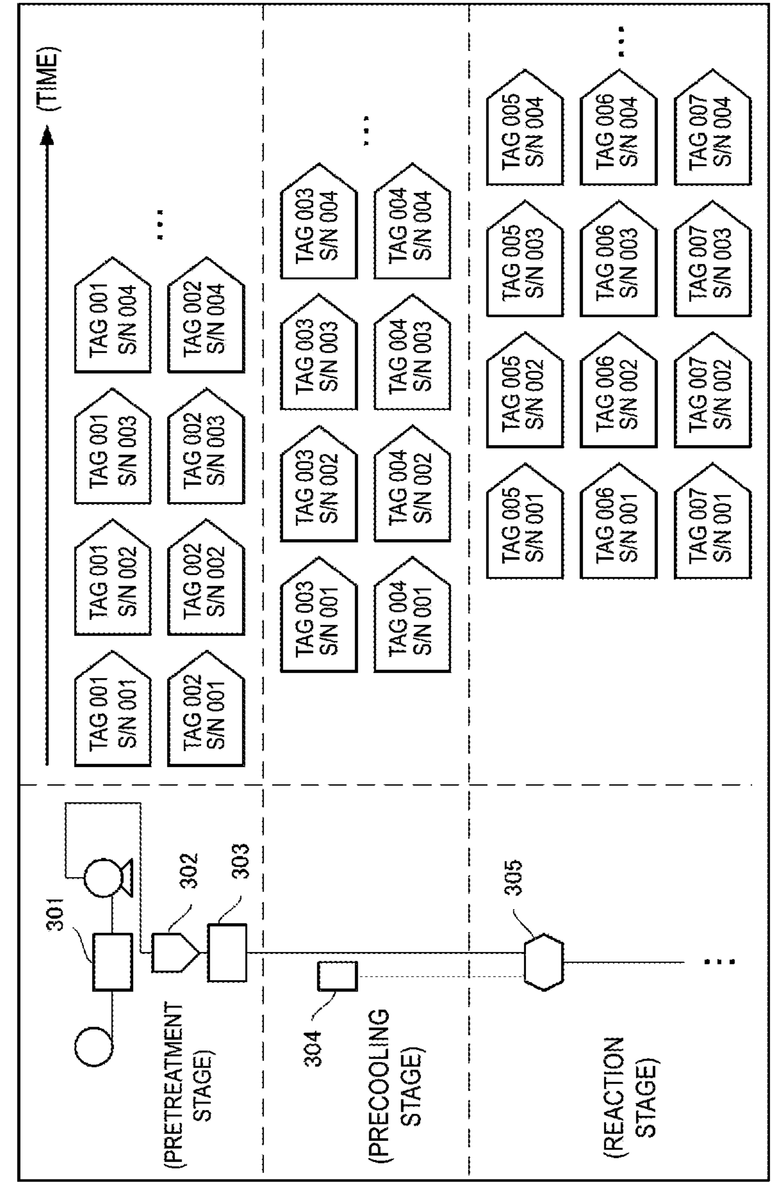
FIG. 3 is a diagram for explaining an example of process data in a batch stage.

FIG. 3 is a diagram for explaining an example of process data in the batch stage. The left column of FIG. 3 indicates a part of the processes of the batch stage 31 illustrated in FIG. 2. Specifically, the processes include a shredder 301, a cyclone 302, a pretreatment 303, a precooler 304, and a reactor 305. Furthermore, the processes are classified into a pretreatment stage, s a precooling stage, and a reaction stage. The right column of FIG. 3 indicates an example of process data acquired in each process. In the pretreatment stage, pieces of time-series data are acquired from sensors with tags 001 and 002. In the precooling stage, pieces of time-series data are acquired from sensors with tags 003 and 004. In the reaction stage, pieces of time-series data are acquired from sensors with tags 005, 006, and 007. Furthermore, in the batch stage, a processing target associated with a product serial number (also referred to as a "S/N", "batch number", "management number") is intermittently processed. That is, the product serial number is identification information for identifying each of the processing targets to be collectively processed in the batch stage. As illustrated in FIG. 3, time-series data related to a processing target associated with a subsequent product serial number obtained over time. In the present embodiment, the control station 2 manages a product serial number and a step indicating a phase of processing in each of the subdivided stages constituting the batch stage. Note that in a case where a step is reset by a Programmable Logic Controller (PLC or sequencer) in the plant 3 connected to the control station 2, the product serial number of the process data output from the control station 2 may be employed as appropriate (e.g., after a set time elapses after the step is switched in the PLC) in accordance with a communication timing between the control station 2 and the plant 3. Furthermore, the set time may be set for each production line or for each subdivided stage.

FIG. 4 is a diagram illustrating an example of a stage line definition table set in advance. In the stage line definition table, for each sequence and each stage, a product serial number, definition of a step indicating a phase of processing in each stage, and a type of a processing target to be processed in each stage are registered. The stage line definition table may also be a so-called database table or may also be a file having a predetermined format such as CSV. Furthermore, the stage line definition table is also created by a user in advance and read by the abnormal irregularity cause identifying device 1.

The stage line definition table includes attributes of a sequence, a stage, S/N, a step, and a product type. In the field of the sequence, identification information for identifying a sequence of a process is registered. In the field of the stage, identification information indicating subdivided stages in the batch stage is registered. In the field of S/N, a product serial number that is identification information for identifying each of the processing targets to be collectively processed in the batch stage is registered. In the field of the step, definition of timing of each of the plurality of steps indicating a phase of processing in the stage is registered. In the field of the product type, the type of processing target is registered.

FIG. 5 is a diagram illustrating an example of a tag definition table set in advance. The tag definition table defines an acquisition timing of process data obtained from a sensor corresponding to each tag.

Note that the tag definition table may also be a so-called database table or may also be a file having a predetermined format such as comma separated values (CSV). Furthermore, the tag definition table is created by a user in advance and read by the abnormal irregularity cause identifying device 1.

The tag definition table includes attributes of a tag, a sequence, a stage, and a collection interval. In the field of the tag, a tag that is sensor identification information is registered. In the field of the sequence, identification information for identifying a sequence of a process is registered. In the field of the stage, identification information indicating subdivided stages in the batch stage is registered. In the field of the collection interval, information indicating an interval of acquiring an output value of a sensor is registered.

Continuous Stage

Figure 6:
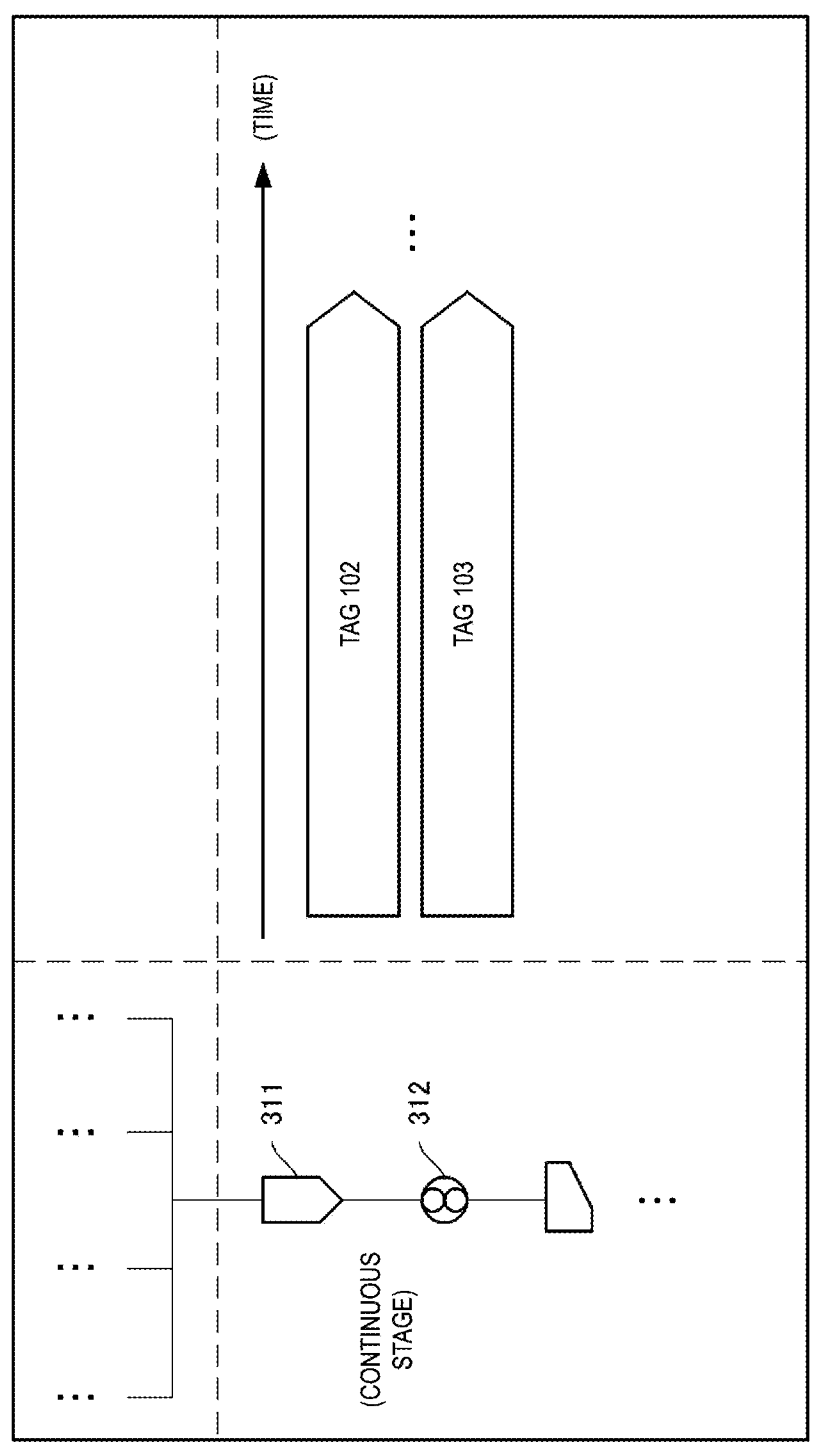
FIG. 6 is a diagram for explaining an example of process data in a continuous stage.

FIG. 6 is a diagram for explaining an example of process data in the continuous stage. The left column of FIG. 6 indicates a part of the processes of the continuous stage 32 illustrated in FIG. 2. Specifically, the processes include a tank 311 and a pump 312. The right column of FIG. 6 indicates an example of process data acquired in each process. In the continuous stage 32, time-series data associated with the tag and not associated with the product serial number is continuously acquired from sensors. In the continuous stage, the time-series data is acquired from each of the sensors with tags 102 and 103. In the continuous stage, the equipment continuously receives a processing target and continuously performs processing.

When the continuous stage is performed after the batch stage, the present embodiment uses traceability information set in advance by a user to associate a processing target in the batch stage with a processing target in the continuous stage. FIG. 7 is a diagram illustrating an example of the traceability information. The traceability information includes attributes of a sampling interval and a residence time. In the field of the sampling interval, a sampling interval for stage inspection by, for example, a sample reduction method in the continuous stage is registered. In the field of the residence time, a residence time of a processing target from the completion of the batch stage until the processing target reaches a process included in the continuous stage is registered.

Figure 8:
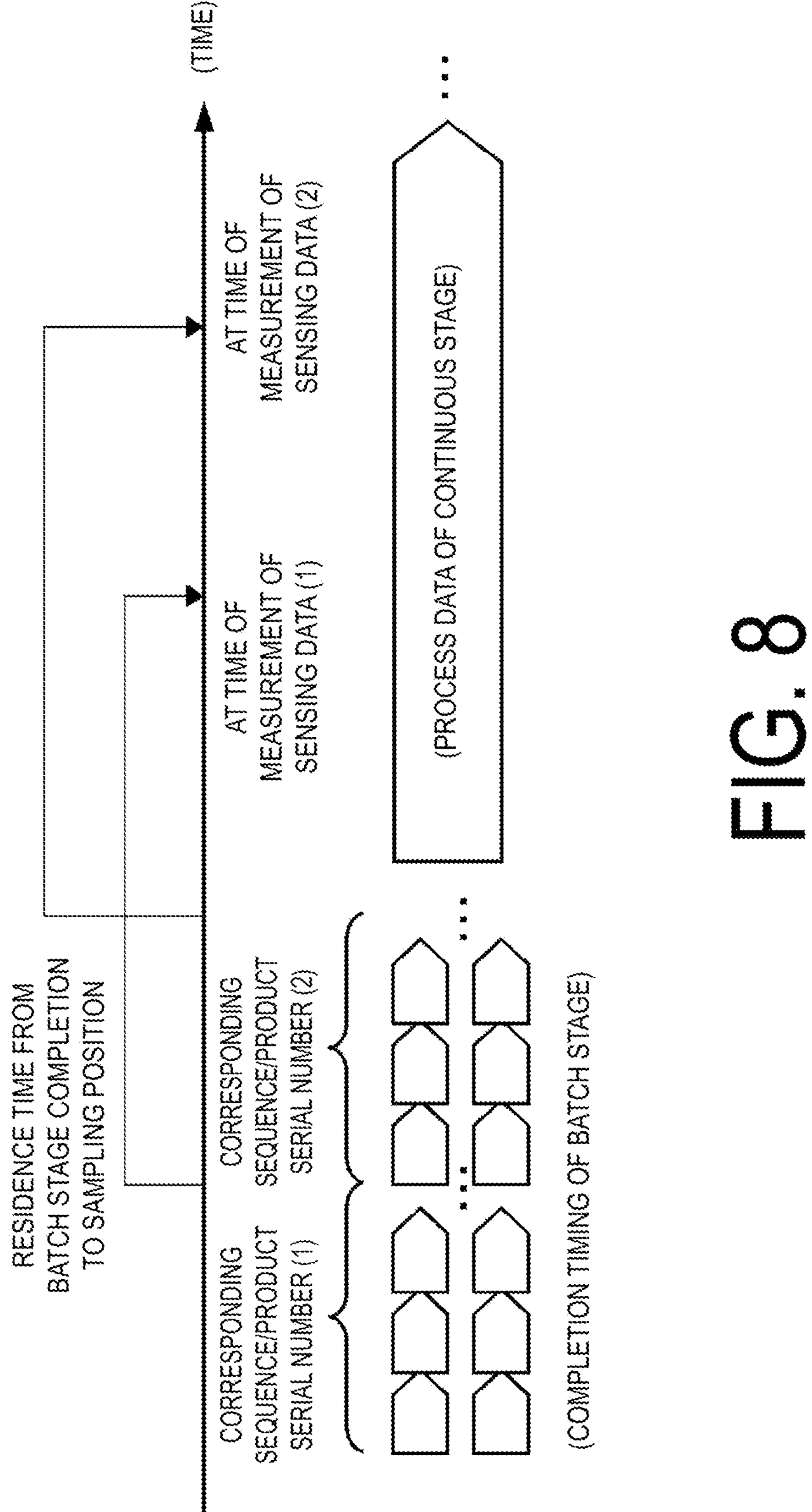
FIG. 8 is a diagram for explaining correspondence between the process data in the continuous stage and a product serial number in the batch stage.

FIG. 8 is a diagram for explaining correspondence between process data in the continuous stage and the product serial number in the batch stage. The process data is acquired at an interval set in the traceability information, for example. Furthermore, when the continuous stage is performed after the batch stage, a product by the batch stage completed in a predetermined period of time is introduced to a tank or the like as a processing target in the continuous stage. Accordingly, the process data in the continuous stage can be associated with the product serial number group whose completion time of the batch stage is included in a predetermined period of time by tracing back the residence time of the processing target from the completion of the batch stage to the measurement time by the sensor. By such an association, when the batch stage and the continuous stage are continuously performed, the accuracy of the abnormality cause identification that uses process data in the batch stage can be improved.

As described above, the accuracy of identifying the abnormality cause can be improved by associating the product serial number in the batch processing with the measurement timing in the continuous stage.

FIG. 9 is a diagram illustrating an example of information pre-registered in the knowledge base. The knowledge base is assumed to be stored in advance in the storage device of the abnormal irregularity cause identifying device 1. The table of FIG. 9 includes a column "influence" corresponding to each of the sensors (tags) and a row indicating "assumed cause" of an irregularity. That is, a direction of variation of each value is registered in columns corresponding to the sensors affected by the causes such as "cause 1" or "cause 2" shown in each row. In the knowledge base, the direction of variation is displayed as "up" representing increase (rise) or "down" (fall) of an output value of a 5 representing decrease sensor.

Note that as illustrated in FIG. 9, the combination of a cause and an influence is not limited to one-to-one relationship. Further, a calculation method, an extraction timing, a threshold value used for abnormality determination, and the like of the process data are defined in association with each sensor. In a row of the calculation method, information indicating a calculation performed on an output value of each sensor is registered. Note that, in the present embodiment, the calculation is performed using a machine learning technique such as, for example, a Hotelling method, a k-nearest neighbor algorithm, DTW Barycenter Averaging, Autoencoder, and graphical lasso. In a row of the extraction timing, information indicating a timing of extracting a value to be used for the abnormality determination among output values of sensors is registered. The timing in the batch processing, for example, may be defined by a step indicating a phase of processing in each stage, a certain period of time, a certain time point, or the like. On the other hand, in the continuous processing, the timing may be defined by the sampling interval, or the like as illustrated in FIG. 7. In a row of the threshold value, a threshold value that is a criterion for determining an abnormality in each abnormality determination technique is registered. The threshold value may include two values, that is, the upper and lower limits, for example. As described above, the knowledge base defines a combination of causal relation between an event that becomes a cause and an influence that is an irregularity of process data resulting from the event. In addition, the combination of causal relation can be represented by a tree format, in which, by using an irregularity appearing as an influence as a root and an assumed cause of the irregularity as a leaf, events appearing in the course from the cause to the irregularity are connected in a hierarchical manner along time series.

It is assumed that the knowledge base is created in advance by a user based on, for example, Hazard and Operability Study (HAZOP). The HAZOP relates to, for example, detection a means at monitoring point by instrumentation equipment constituting a plant, a management range (upper and lower limit thresholds, which are alarm setting points), a deviation from the management range (an abnormality and an irregularity), a list of assumed causes of the deviation from the management range, a logic (detection means) that determines which assumed cause caused the deviation, an influence of the deviation, measures to be taken when the deviation has occurred, and an action for the measures and is a technique to associate and comprehensively enumerate them. Note that in addition to the HAZOP, the knowledge base may be created based on Fault Tree Analysis (FTA), Failure Mode and Effect Analysis (EMEA), Event Tree Analysis (ETA), a technique based on them, a technique similar to them, contents extracted from results of hearings with operators, or contents extracted from work standards and technical standards. In the present embodiment, abnormality detection is performed based on a parameter that is assumed to have causal relation in the knowledge base.

Figure 10:
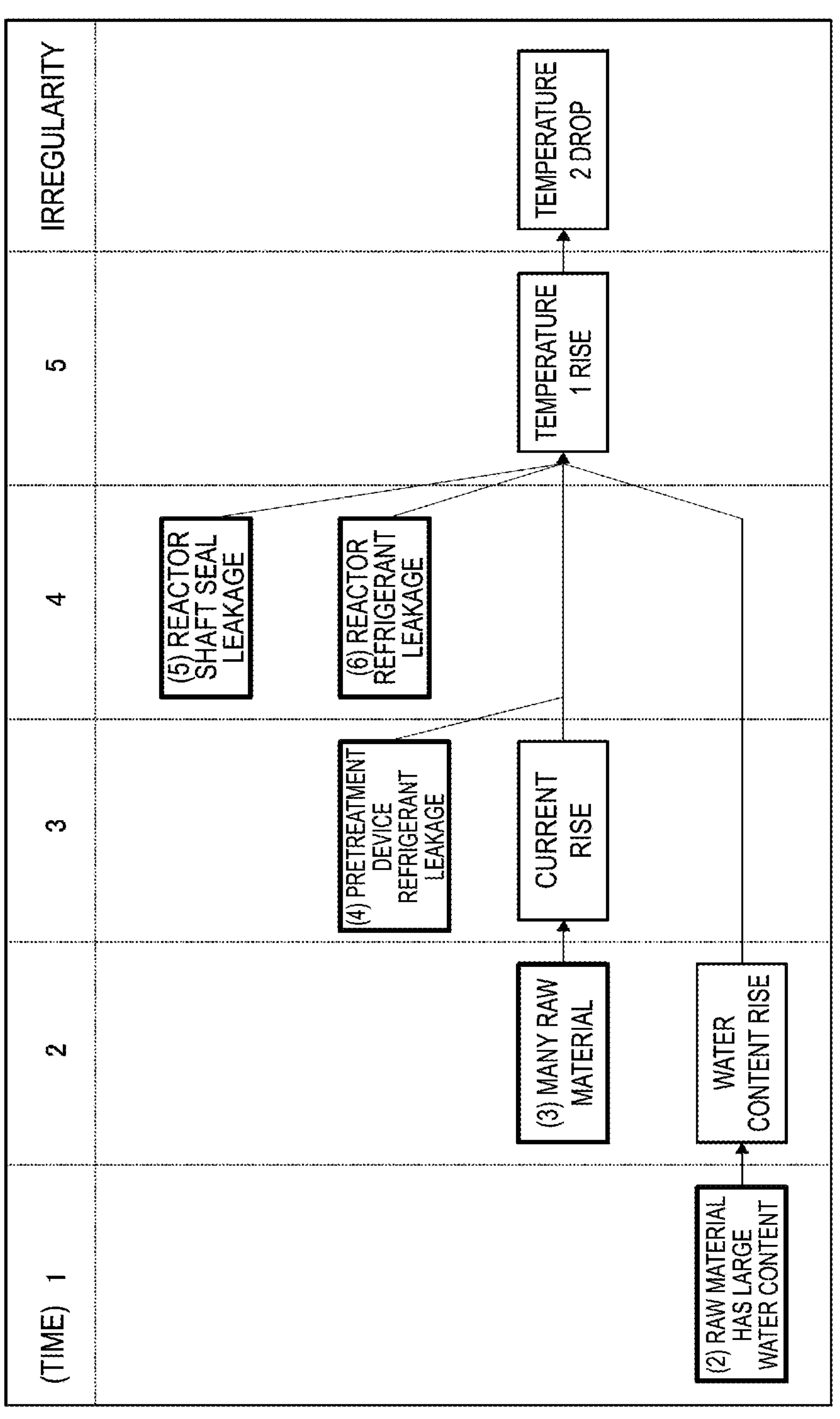
FIG. 10 is a diagram illustrating an example of a logic tree representing a relationship between an irregularity and its cause.

Based on the information set in the table as described above, the abnormal irregularity cause identifying device 1 extracts data of a predetermined timing among pieces of process data acquired from the plant 3 and performs abnormality determination by the predetermined technique. FIG. 10 is a diagram illustrating an example of the logic tree representing a relation between an irregularity and a cause thereof. The logic tree can be created based on the knowledge base shown in FIG. 9. Furthermore, in the logic tree in FIG. 10, an event that is upstream in the production stage and earlier in the time series is arranged on the left, an event that is downstream in the production stage and later in the time series is arranged on the right, and the events are connected using an arrow from the assumed cause to the irregularity appearing as an influence in a hierarchical manner. In addition, in the logic tree, if there are a plurality of assumed causes for one irregularity in the knowledge base table, events are branched and connected, and events appearing in common in the course from the assumed causes to the irregularity are grouped together and displayed. A thick solid-line rectangle located at the upstream end of each branch corresponds to an assumed cause of the knowledge base table, to which numbers in parentheses in FIG. 9 and FIG. 10 correspond. Furthermore, each thin solid-line rectangle corresponds to an influence of the knowledge base table and represents an event that can be observed by the process data. For each of such influences, calculation in accordance with a calculation method defined in the knowledge base table is performed. In addition, for each assumed cause, a model including a mathematical formula for performing the above-described calculation is defined, and it is possible to detect an abnormality or a sign thereof and support the cause identification by using the model.

Calculation Method

The above-described calculation may include, for example, the following techniques. Furthermore, the abnormal irregularity cause identifying device 1 may display these calculation results.

Hotelling Method ($T^2$ Method)

For example, assuming that a plurality of pieces of process data obtained from one sensor follow a predetermined probability density function, an average and a standard deviation of the population are estimated from a sample average and a sample standard deviation calculated by using the process data. The predetermined probability density function is, for example, a normal distribution. Then, the abnormality degree is obtained based on a distance from the average of the population to the process data to be verified. For example, the abnormality degree is determined based on the square of the Mahalanobis distance. Note that an instantaneous value of the process data itself may be used, or the abnormality degree based on the Hotelling theory may be calculated by using a maximum value, a minimum value, an integration value, a standard deviation, a derivative coefficient (inclination), or the like of the pieces of process data in a predetermined period of time. According to the Hotelling method, it is possible to detect an outlier from a predetermined criterion.

k-Nearest Neighbor Algorithm

The pieces of time-series process data obtained, for example, from one or more sensors are vectorized or made to be a matrix to calculate a distance between data pieces. The distance may be a Euclidean distance or may be a Mahalanobis distance or a Manhattan distance. Then, the abnormality degree is determined in accordance with the distance from the data to be verified to the k-th nearest data. In the k-nearest neighbor algorithm, the abnormality degree is determined based on the relationship with other pieces of data. Thus, for example, in a case where a normal value can be classified into a plurality of clusters, it is possible to detect an outlier far from all of the plurality of clusters.

Dynamic Time Wrapping (DTW) Barycenter Averaging

Figure 11:
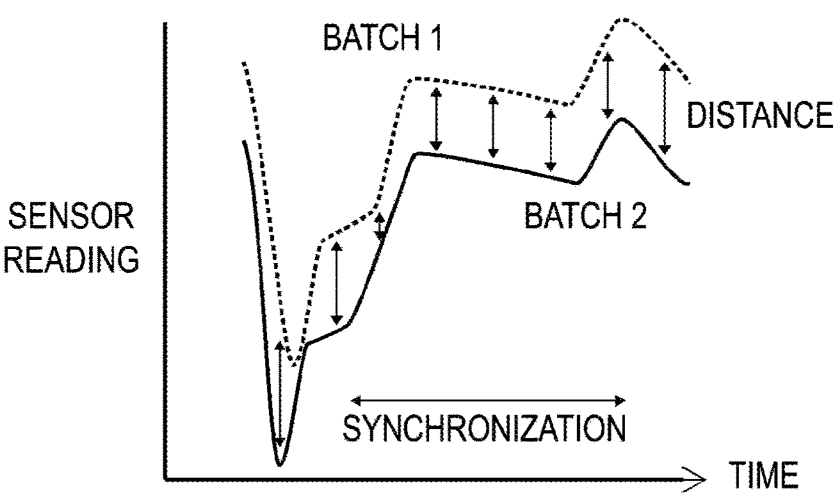
FIG. 11 is a diagram for explaining synchronization processing of process data.

Based on a plurality of pieces of time-series data such as pieces of process data in different batch processing operations, average time-series data can be calculated. For example, for pieces of process data having different product serial numbers in a corresponding section in batch processing operations, a distance from each of the pieces of process data to the average time-series data can be calculated. FIG. 11 is a diagram for explaining synchronization processing of process data. For individual values which are elements included in the pieces of time-series data of the batch processing operations having different product serial numbers, the shortest distances between values included in different pieces of time-series data are obtained in a round-robin manner, and then alignment is performed by sliding the time-series data in a time-axis direction in such a manner that an integrated value of the shortest distances becomes smallest. That is, based on the degree of similarity of the time-series data, the plurality of pieces of time-series data are synchronized. In this way, it becomes possible to superimpose and display a plurality of pieces of process data in such a manner that steps in the stage performed in the plant 3 correspond in chronological order. Then, based on the integrated value of the distances between synchronized pieces of the time-series data, the abnormality degree is calculated by the k-nearest neighbor algorithm or the Hotelling theory. According to the DTW Barycenter Averaging, it is possible to detect an abnormality based on the degree of similarity between pieces of the time-series data.

Figure 12:
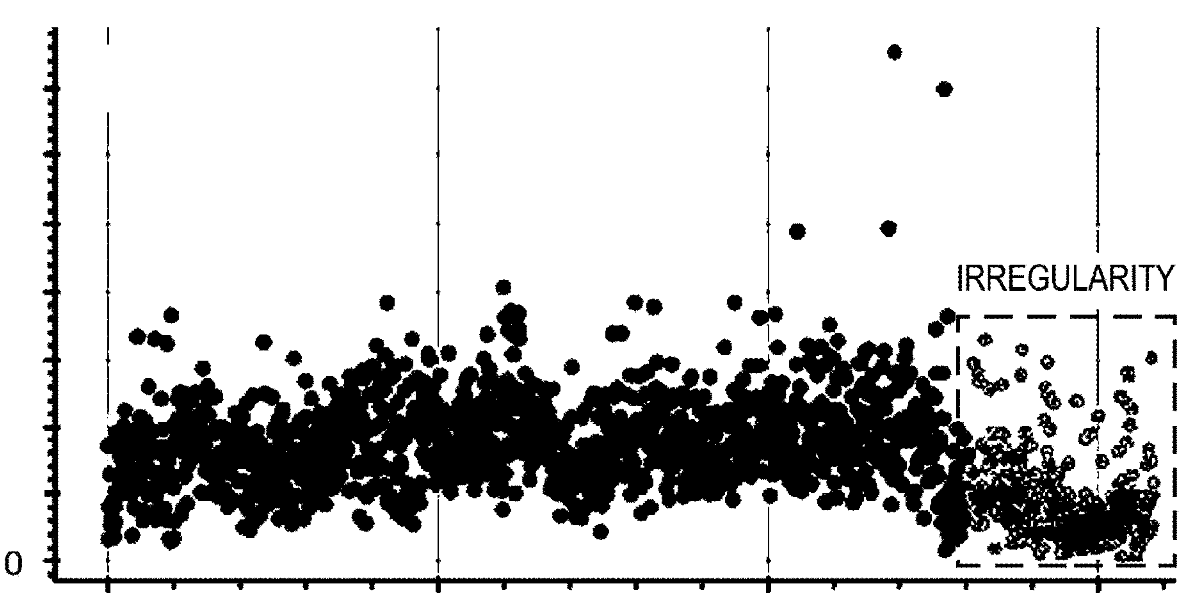
FIG. 12 is a diagram for explaining an example of calculating an abnormality degree by a distance from a criterion for time-series data.
Figure 13:
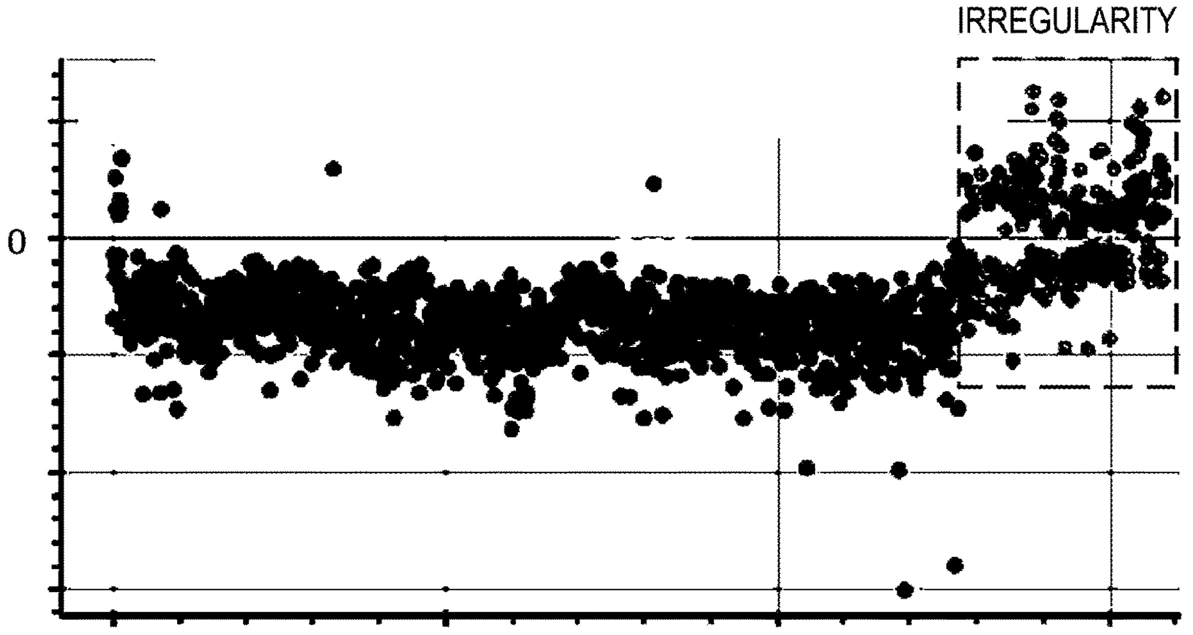
FIG. 13 is a diagram for explaining an example of calculating an abnormality degree by a distance from a criterion in consideration of a positive-negative direction for the time-series data.

For divergence from a criterion such as an average, the abnormality degree with a positive or negative sign may be calculated. FIG. 12 is a diagram for explaining an example of calculating an abnormality degree by magnitudes of distances of pieces of time-series data from a criterion. FIG. 13 is a diagram for explaining an example of calculating an abnormality degree by distances of the same pieces of time-series data from a criterion in consideration of positive-negative directions. In each figure, for example, the vertical axis represents an extent of divergence from the average. In a portion indicated by the dashed-line rectangle, irregularities actually occur, but detection is difficult from only the values shown in the example in FIG. 12. On the other hand, in the example of FIG. 13, tendency the positive-negative directions deviate reversely appears, and thus the detection of the irregularities is facilitated.

For example, in the above-described Hotelling method, by obtaining the extent of divergence from the criterion as a value with a positive or negative sign without squaring the distance, the abnormality degree as illustrated in FIG. 13 is obtained. In the DTW Barycenter Averaging or the like, for a characteristic point such as the local maximum value in the time-series data, for example, a positive or negative sign is determined by the following equation, and the calculated value is multiplied by the magnitude of the distance.

$$\text{Sign determination equation}=(\mu-x)/|\mu-x|$$

Note that μ is an average value (reference value) of training data, and x is process data to be verified. In this manner, according to the sign determination equation, it is possible to determine the sign representing the direction of divergence from the criterion at the above time point in accordance with the magnitude relationship between the reference value of the time-series data at a predetermined time point and the process data to be verified at the corresponding time point. In addition, by using the value with a sign indicating the extent of divergence from the criterion, the abnormality degree as in FIG. 13 can be obtained, and thus false detection can be suppressed. Further, as a characteristic point in the time-series data, in addition to the local maximum value, the local minimum value, a difference between process data at a time point and process data at another time point, or the like may be used.

Autoencoder

Figure 14:
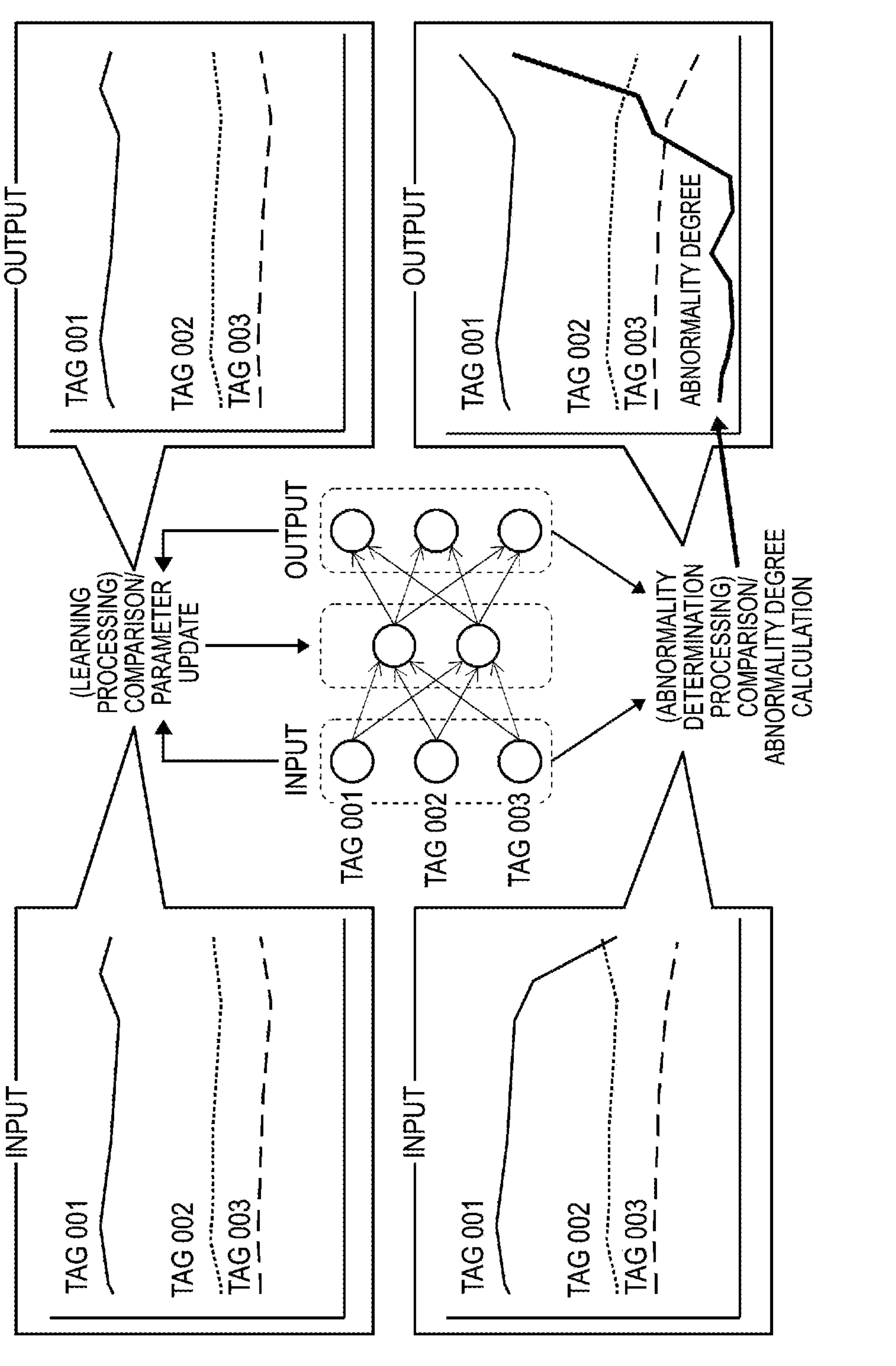
FIG. 14 is a diagram for explaining abnormality detection using an autoencoder.

FIG. 14 is a diagram for explaining the abnormality detection by using an autoencoder. In this technique, the abnormality determination is performed based on characteristics of the relationship of pieces of process data from a plurality of sensors. Specifically, a neural network is used and for example, process data itself of continuous processing or batch processing, which is input data, is used as a teacher value to create a model which can compress (encode) and restore (decode) the input data. In the neural network, for example, the number of nodes in an input layer and an output layer corresponds to the number of sensors, and the number of nodes in an intermediate layer is smaller than the number of sensors. Information input to the input layer is compressed in the intermediate layer and restored in the output layer. Note that a plurality of intermediate layers may exist, and the connection structure between the layers is not limited to full connection. Then, learning processing is performed by using the process data at the normal time as training data, and a model in which parameters are adjusted to reduce a difference between a value of the input layer and a value of the output layer, is created. Furthermore, in the abnormality determination processing, process data to be verified is input, and the abnormality degree in accordance with the difference between the value of the input layer and the value of the output layer is calculated. That is, in a case where abnormal process data is input, information compressed in intermediate cannot be the layer appropriately restored in the output layer and the difference between values of the input layer and the output layer increases, and thus the abnormality detection can be performed based on this difference. According to the autoencoder, an abnormality can be detected based on characteristics of the relationship between the output values of the plurality of sensors.

Graphical Lasso

For example, based on a covariance matrix of pieces of process data from a plurality of sensors in continuous processing or batch processing, dependence between variables is quantified and represented as a sparse graph serving as a criterion. At the normal time, it can be determined that the dependence between variables does not greatly deviate from the criterion. Then, in the abnormality determination processing, dependence between variables is obtained by using process data to be verified, and the abnormality degree in accordance with the magnitude of a difference from the above-described criterion is calculated. According to the graphical lasso, the correlation between pieces of the process data can be quantified, and the abnormality degree can be detected based on collapse of the correlation.

Alternatively, common abnormality detection techniques or techniques based on these may be further used. In addition, for a threshold value used for the abnormality detection in each of the techniques, process data actually obtained in operation of the plant 3 may be used to search for a value with which false determination is less likely to be performed at the normal time as possible and occurrence of abnormality or a sign thereof can be quickly detected at the abnormal time, and the value may be registered in the knowledge base illustrated in FIG. 9.

Device Configuration

Figure 15:
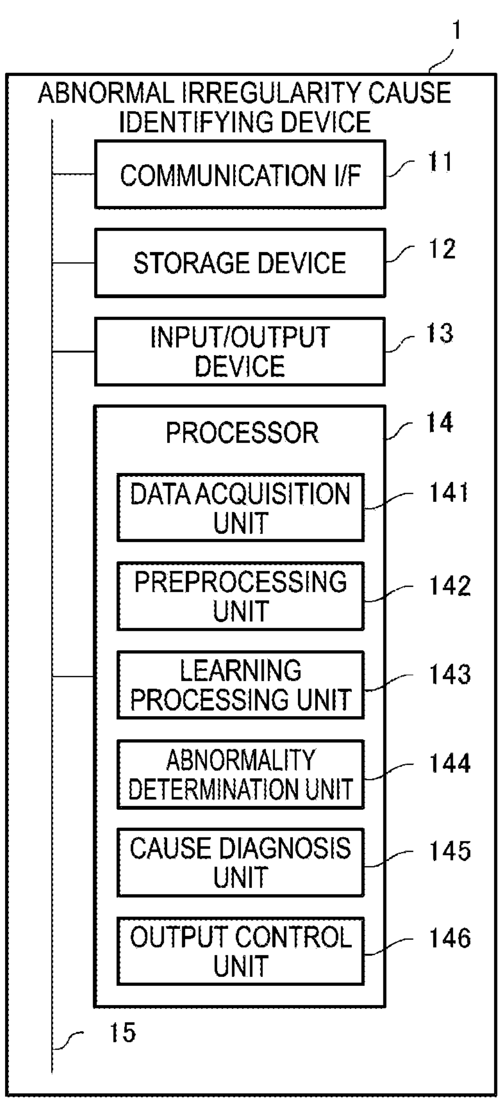
FIG. 15 is a block diagram illustrating an example of a configuration of an abnormal irregularity cause identifying device.

FIG. 15 is a block diagram illustrating an example of the configuration of the abnormal irregularity cause identifying device 1. The abnormal irregularity cause identifying device 1 is a general-purpose computer and includes a communication interface (I/F) 11, a storage device 12, an input/output device 13, and a processor 14. The communication I/F 11 may be, for example, a network card or a communication module and communicates with another computer based on a predetermined protocol. The storage device 12 may be a main storage device such as a Random Access Memory (RAM) or a Read Only Memory (ROM), and an auxiliary storage device (secondary storage device) such as a Hard-Disk Drive (HDD), a Solid State Drive (SSD), and a flash memory. The main storage device temporarily stores a program to be read by the processor 14 and information transmitted to and received from other computers and secures a work area of the processor 14. The auxiliary storage device stores a program to be executed by the processor 14 and information and the like transmitted to and received from other computers. The input/output device 13 is a user interface, which is, for example, an input device such as a keyboard and a mouse, an output device such as a monitor, an input/output device such as a touch panel, or the like. The processor 14 is an arithmetic processing device such as a Central Processing Unit (CPU) and performs each processing according to the present embodiment by executing the program. In the example of FIG. 15, functional blocks are illustrated in the processor 14. That is, the processor 14 executes a predetermined program to function as a process data acquisition unit 141, a preprocessing unit 142, a learning processing unit 143, an abnormality determination unit 144, a cause diagnosis unit 145, and an output control unit 146.

The process data acquisition unit 141 acquires process data from the sensors included in the plant 3 via the communication I/F 11 and the control station 2 and stores the process data in the storage device 12. As described above, the process data is associated with the sensor by the tag.

When an abnormality detection model is created, the preprocessing unit 142 processes the process data. For example, the preprocessing unit 142 associates the process data with the product serial number. That is, based on the above-mentioned traceability information held in the storage device 12 in advance, the process data that corresponds to a predetermined tag, a sequence, and a product serial number in the batch processing is associated with the process data that corresponds to a predetermined tag and is output at a predetermined timing in the continuous processing. Furthermore, data for a predetermined period of time used in the abnormality determination is extracted based on a set value of a table such as the knowledge base, and a feature amount in accordance with each technique is calculated. Note that in the learning processing, the preprocessing unit 142 may perform data cleansing to exclude data in an unsteady operation period, data at the time of abnormality occurrence, an outlier such as noise, and the like, thereby extracting training data.

The learning processing unit 143 an creates abnormality detection model including one or more calculations based on, for example, the knowledge base, and makes the storage device 12 store the abnormality detection model. At this time, the learning processing unit 143 determines a parameter that has learned characteristics of the training data. Note that in a case where the learning processing is performed by using output values of a plurality of sensors, normalization may be performed as appropriate.

The abnormality determination unit 144 calculates the abnormality degree by using the process data and the abnormality detection model.

That is, the abnormality determination unit 144 calculates the abnormality degree by using test data for performing cross validation and the abnormality detection model in the learning processing. Furthermore, in the abnormality determination processing, the abnormality degree is calculated by using the process data acquired from the plant 3.

The cause diagnosis unit 145 calculates the degree of satisfaction (accuracy) for each of the plurality of assumed causes by using the calculated abnormality degree. The degree of satisfaction is calculated, for example, by using the abnormality degree calculated by the abnormality determination unit based on a proportion of influence appearing on the process data and an extent thereof, among influences associated with each of the assumed causes in the knowledge base. In addition, an action representing a handling to be taken for a cause may be stored in association with each of the assumed causes in the storage device 12, and thus the action can be presented to a user.

The output control unit 146 issues an alarm and outputs a degree of satisfaction for each of the assumed causes in a case where an abnormality is detected, for example, via the input/output device 13. To the output control unit 146, the above components are connected via a bus 15 as appropriate in accordance with an operation by the user. Note that, convenience, one device for illustrated in FIG. 15 includes the process data acquisition unit 141, the preprocessing unit 142, the learning processing unit 143, the abnormality determination unit 144, the cause diagnosis unit 145, and the output control unit 146, but at least a part of the functions may be distributed to a different device.

Learning Processing

Figure 16:
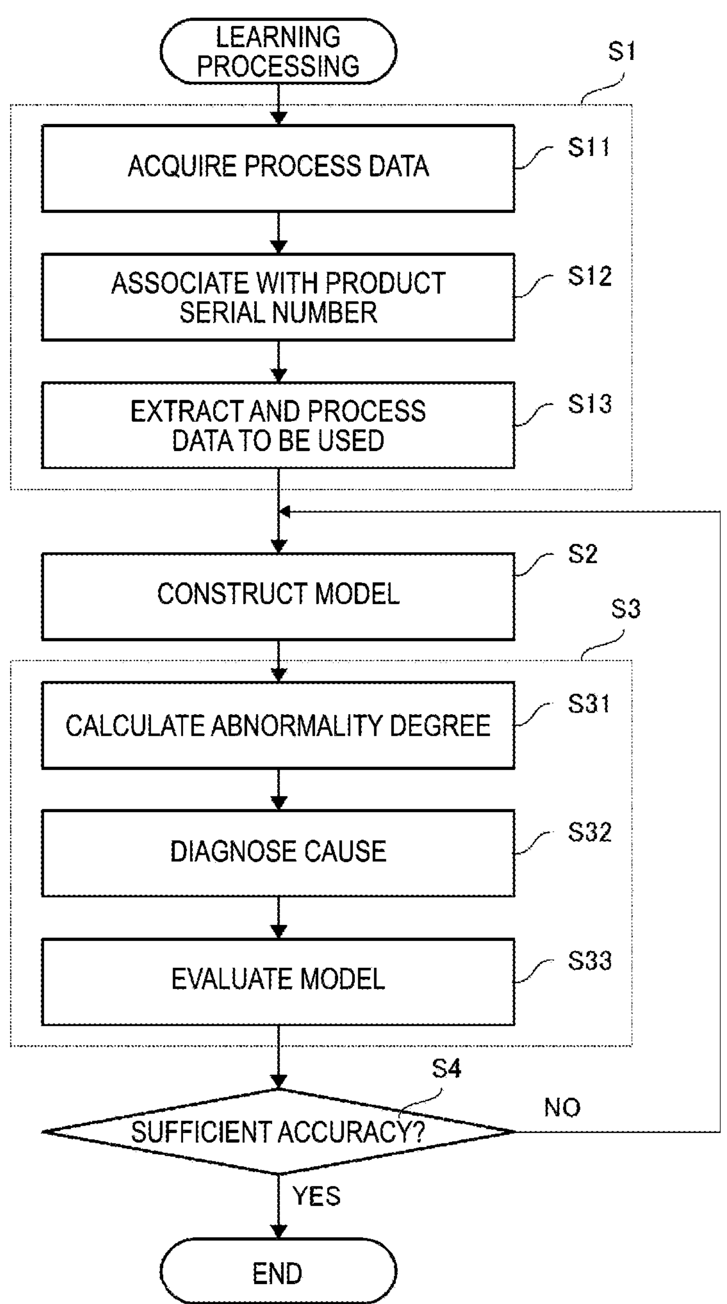
FIG. 16 is a processing flow chart illustrating an example of learning processing performed by the abnormal irregularity cause identifying device.

FIG. 16 is a processing flow chart illustrating an example of learning processing performed by the abnormal irregularity cause identifying device 1. The processor 14 of the abnormal irregularity cause identifying device 1 performs the processing as illustrated in FIG. 16 by executing a predetermined program. The learning processing is executed at any timing by using the process data obtained from past operations of the plant 3. In addition, the learning processing includes mainly preprocessing (S1 in FIG. 16), model construction processing (S2), and verification processing (S3). That is, some of the pieces of process data may be used as training data and the other may be used as test data to perform cross validation. Note that the table and the like described above are created by a user and are stored in advance in the storage device 12. For convenience, the preprocessing, the learning processing, and the verification processing are described in one processing flow illustrated in FIG. 16, but at least a part such as the preprocessing or verification processing may be distributed and executed in a different device.

The process data acquisition unit 141 of the abnormal irregularity cause identifying device 1 acquires the process data (S11 in FIG. 16). In the present step, data used in the abnormality detection model is extracted, among the pieces of process data as illustrated in FIG. 3 and FIG. 6. The process data is assumed to be stored in the storage device 12 as OPC data, a so-called database table, or a file having a predetermined format such as CSV. Furthermore, the process data may include attributes such as date and time and a tag, and, in particular, the process data in batch processing may further include attributes such as S/N and a step.

Furthermore, the preprocessing unit 142 of the abnormal irregularity cause identifying device 1 associates the process data in continuous processing with the product serial number (S12 in FIG. 16). In the present step, as illustrated in FIG. 8, the process data acquired in the continuous stage is associated with the product serial number group of the process data acquired in batch processing, and thus the process data used in calculating the abnormality degree is associated. That is, in the knowledge base illustrated in FIG. 9 and the logic tree illustrated in FIG. 11, in a case where a cause affects both the process data in batch processing and the process data in continuous processing, the abnormality degree and the degree of satisfaction are calculated based on the data associated in the present step.

Then, the preprocessing unit 142 extracts and processes data to be used in the abnormality determination model (S13 in FIG. 16). In the present step, the preprocessing unit 142 extracts data in a predetermined period of time to be used in the abnormality determination based on a set value of a table such as the knowledge base and calculates a feature amount in accordance with each technique.

For example, in a case where the abnormality degree is calculated by the Hotelling method, the preprocessing unit 142 extracts the process data in a predetermined timing or period of time, calculates an instantaneous value that is the process data itself, a maximum value, a minimum value, an integrated value, or a difference of the process data, an integrated value of a reaction rate, a derivative at a predetermined time point, and the like, and stores the calculated values in the storage device 12. Furthermore, in a case where the abnormality degree is calculated by the k-nearest neighbor algorithm, the pieces of time-series process data is vectorized or made to be a matrix. In a case where the abnormality degree is calculated by the DTW Barycenter Averaging, synchronization processing is performed on a plurality of pieces of process data to obtain average time-series data. In a case where the abnormality degree is calculated by the autoencoder or the graphical lasso, synchronization processing is performed on a plurality of pieces of process data.

Note that the preprocessing unit 142 may perform predetermined data cleansing for the process data. The data cleansing processing is processing for excluding an outlier, and various techniques can be employed. For example, latest data may be used to calculate a moving average value. Furthermore, a difference between the moving average value and a measured value is taken, and a standard deviation σ representing a variation in the difference is obtained. Then, a value that does not fall within a predetermined confidence interval, such as an interval from the mean of the probability distribution−3σ to the mean of the probability distribution+3σ (also referred to as a 3σ interval), may be excluded. Likewise, a value that does not fall within the 30 interval may be excluded for the difference between measured values before and after.

Thereafter, the learning processing unit 143 of the abnormal irregularity cause identifying device 1 performs abnormality detection model construction processing (S2 in FIG. 16). In the present step, based on the knowledge base illustrated in FIG. 9, an abnormality detection model including calculation of an abnormality degree is created. Specifically, for each of one or more "influences" associated with the corresponding one of the "assumed causes" in FIG. 9, the abnormality degree by the technique registered in the "calculation method" is calculated to create the abnormality detection model represented by the combination of abnormality degrees. In addition, the learning processing unit 143 adjusts parameters of the model by using the training data depending on the type of abnormality detection technique. For example, in a case where the abnormality degree is calculated by the autoencoder, a weight factor between layers is adjusted in such a manner that the information of input process data can be restored after compression. In a case where the abnormality degree is calculated by the graphical lasso, the dependence between variables is quantified based on the covariance matrix of the pieces of process data from a plurality of sensors. Then, the learning processing unit 143 stores the created abnormality detection model in the storage device 12.

The abnormality determination unit 144 of the abnormal irregularity cause identifying device 1 calculates the abnormality degree by using the created abnormality detection model and the test data (S31 in FIG. 16). In the present step, the abnormality determination unit 144 calculates the abnormality degree in accordance with the techniques of calculating the abnormality degree. For example, in a case where the abnormality degree is calculated by the Hotelling method, the sample average and the sample standard deviation of the population are estimated by using the process data, and the abnormality degree is obtained based on the distance from the average of the population to the process data to be verified. In a case where the abnormality degree is calculated by the k-nearest neighbor algorithm, distances between pieces of the data are calculated, and the abnormality degree in accordance with the distance between the data to be verified and the k-th nearest data from the data to be verified is calculated. In a case where the abnormality degree is calculated by the DTW Barycenter Averaging, the abnormality degree is obtained by the k-nearest neighbor algorithm or the Hotelling theory based on the integrated value of distances between pieces of the time-series data synchronized in the preprocessing. In a case where the abnormality degree is calculated by the autoencoder, the process data to be verified is input to the autoencoder, and the abnormality degree in accordance with the difference between a value of the input layer and a value of the output layer is obtained. In a case where the abnormality degree is calculated by the graphical lasso, the process data to be verified is used to obtain dependence between variables, and the abnormality degree in accordance with a magnitude of the difference between the dependence and dependence serving as a criterion is obtained.

The cause diagnosis unit 145 of the abnormal irregularity cause identifying device 1 obtains the degree of satisfaction of the assumed cause by using the calculated abnormality degree (S32 in FIG. 16). In the present step, for each of the assumed causes of the knowledge base, the degree of satisfaction is calculated based on a proportion in which irregularity associated as an influence appears. For example, three influences, that is, rise of water content of a tag 002, rise of temperature 1 of a tag 004, and drop of temperature 2 of a tag 005, are associated with a cause (2) of FIG. 9. By using the abnormality degree calculated for each of the influences in S31 in FIG. 16, a proportion of the three influences whose abnormality degree exceeds a threshold value may be used as the degree of satisfaction. In a case where the abnormality degrees of two influences of the three influences exceeds the threshold value, for example, the degree of satisfaction can be 66.7%. Alternatively, in calculating the degree of satisfaction, weighting may be further performed depending on the type of influence (tag) or based on the magnitude of the abnormality degree. For example, as the degree of satisfaction, each influence may be multiplied by a weight and then the sum of the multiplication results may be obtained.

Furthermore, the output control unit 146 outputs the abnormality degree calculated in S31 and the degree of satisfaction calculated in S32 for the user to evaluate the created model (S33 in FIG. 16). In the present step, the cross validation is performed using test data that is different from the training data used for construction of the model, among the pieces process data collected from past operations of the plant 3. In addition, in the present step, the process data at the time when an abnormality occurred in the past is also used to verify whether an abnormality is appropriately detected and an alarm or an action to handle the abnormality is output. Furthermore, the learning processing unit 143 determines whether an abnormality can be detected with sufficient accuracy (S4 in FIG. 16). In a case where it is determined that the accuracy is insufficient (S4: NO), the threshold value registered in the knowledge base (in other words, a normal range of the process data) is modified in such a manner that the abnormality can be detected appropriately, and the processing after S31 is repeated. In a case where it is determined that the abnormality can be detected with sufficient accuracy in S4 (S4: YES), an operation by using the abnormality detection model created in S2 and the threshold value is performed. Note that at least a part of determination in S4 may be made by a user.

Note that for the action, for example, in association with an assumed cause, an action to be performed by an operator of the plant 3 to handle the cause is assumed to be stored in the storage device 12 in advance. FIG. 17 is a diagram illustrating an example of an action table. The table in FIG. 17 includes attributes of a cause, action 1, and action 2. In the field of the cause, a cause corresponding to the assumed cause in the knowledge base is registered. In the fields of the action 1 and the action 2, information representing a procedure in which the operator of the plant 3 should take to eliminate a corresponding cause is registered.

Abnormality Detection Processing

Figure 18:
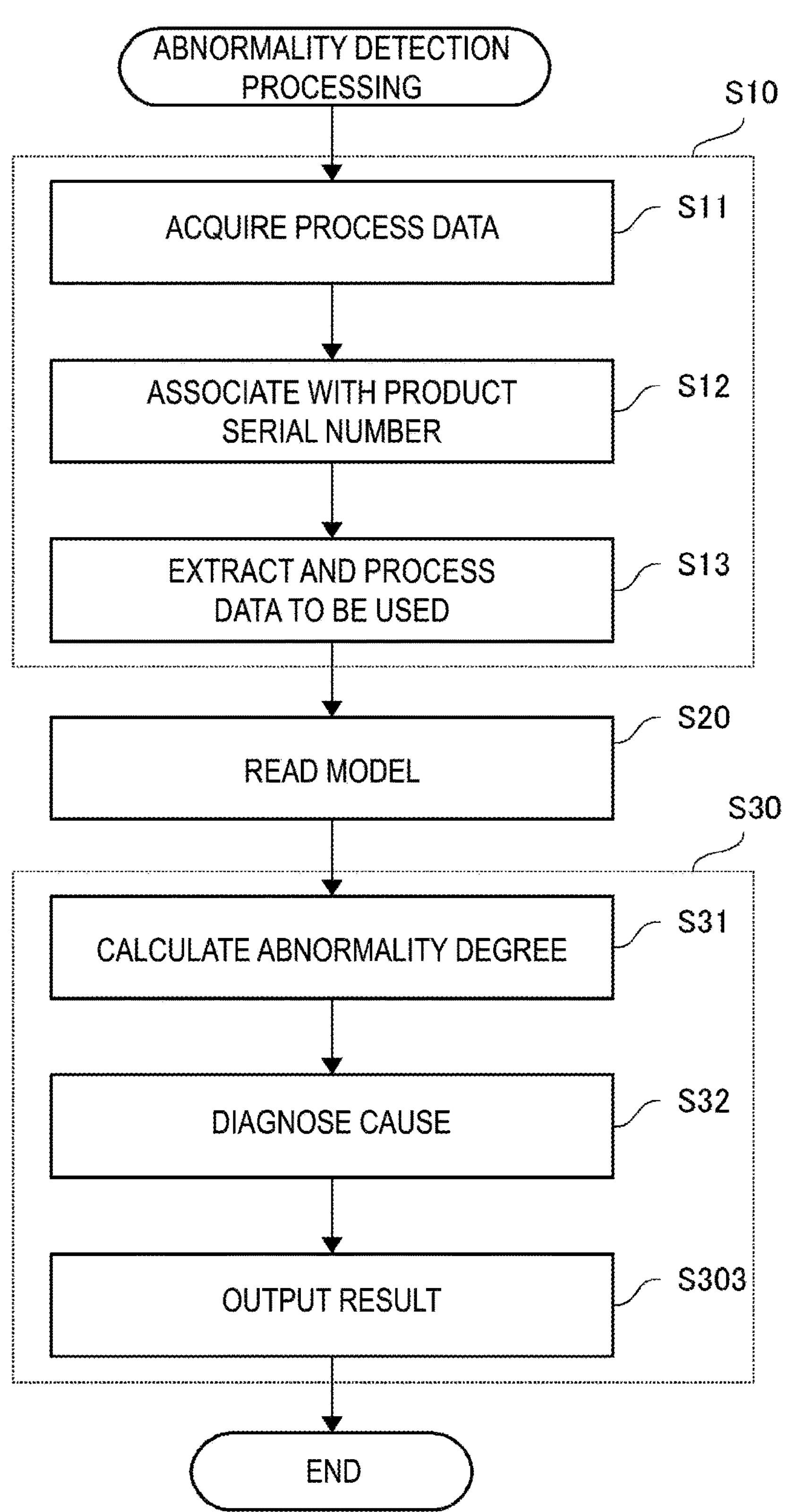
FIG. 18 is a processing flow chart illustrating an example of abnormality detection processing performed by the abnormal irregularity cause identifying device.

FIG. 18 is a processing flow chart illustrating an example of the abnormality detection processing performed by the abnormal irregularity cause identifying device 1. The processor 14 of the abnormal irregularity cause identifying device 1 performs the processing as illustrated in FIG. 18 by executing a predetermined program. The abnormality detection processing is performed in nearly real time by using process data obtained during operation of the plant 3. The abnormality detection processing mainly includes preprocessing (S10 in FIG. 18), model reading processing (S20), and abnormality determination processing (S30). In FIG. 18, the same reference signs are given to the stages corresponding to the learning processing illustrated in FIG. 16, and the following description is made mainly on differences from the learning processing. For convenience, description will be given of the same device as the device for performing the learning processing, but the device for performing the abnormality detection processing may be different from the device for performing the learning processing. Furthermore, the abnormality detection model created in the learning processing, the threshold value, and the table such as the knowledge base are assumed to be stored in the storage device 12 in advance.

The process data acquisition unit 141 of the abnormal irregularity cause identifying device 1 acquires the pieces of process data (S11 in FIG. 18). The process data is assumed to be stored in the storage device 12 as OPC data, a so-called database table, or a file having a predetermined format such as CSV. The present step is substantially similar to S11 in FIG. 16, but pieces of data regarding the processes during operation in the plant 3 are acquired. Furthermore, the preprocessing unit 142 of the abnormal irregularity cause identifying device 1 associates each of the pieces of process data in continuous processing with the corresponding one of product serial numbers (S12 in FIG. 18). The present step is the same as that of S12 in FIG. 16. Then, the preprocessing unit 142 extracts and processes data to be used in the abnormality determination model (S13 in FIG. 18). The present step is substantially similar to S13 in FIG. 16 but does not need to perform data cleansing.

Thereafter, the abnormality determination unit 144 of the abnormal irregularity cause identifying device 1 reads the abnormality detection model created in the learning processing from the storage device 12 (S20 in FIG. 18). Furthermore, the abnormality determination unit 144 uses the created abnormality detection model and the pieces of process data obtained from the operation of the plant 3 to calculate the abnormality degrees (S31 in FIG. 18). The present step is the same as that of S31 in FIG. 16. Furthermore, the cause diagnosis unit 145 of the abnormal irregularity cause identifying device 1 uses the calculated abnormality degrees to obtain the degree of satisfaction of the assumed cause (S32 in FIG. 18). The present step is the same as that of S32 in FIG. 16.

Furthermore, the output control unit 146 outputs the abnormality degrees calculated in S31 and the degree of satisfaction calculated in S32 and issues an alarm when any of the abnormality degrees exceeds a predetermined threshold value (S303 in FIG. 18). In the present step, the process data, the abnormality degree, and the degree of satisfaction of the assumed cause indicating the operation state of the plant 3 are presented to the user via the input/output device 13.

Figure 19:
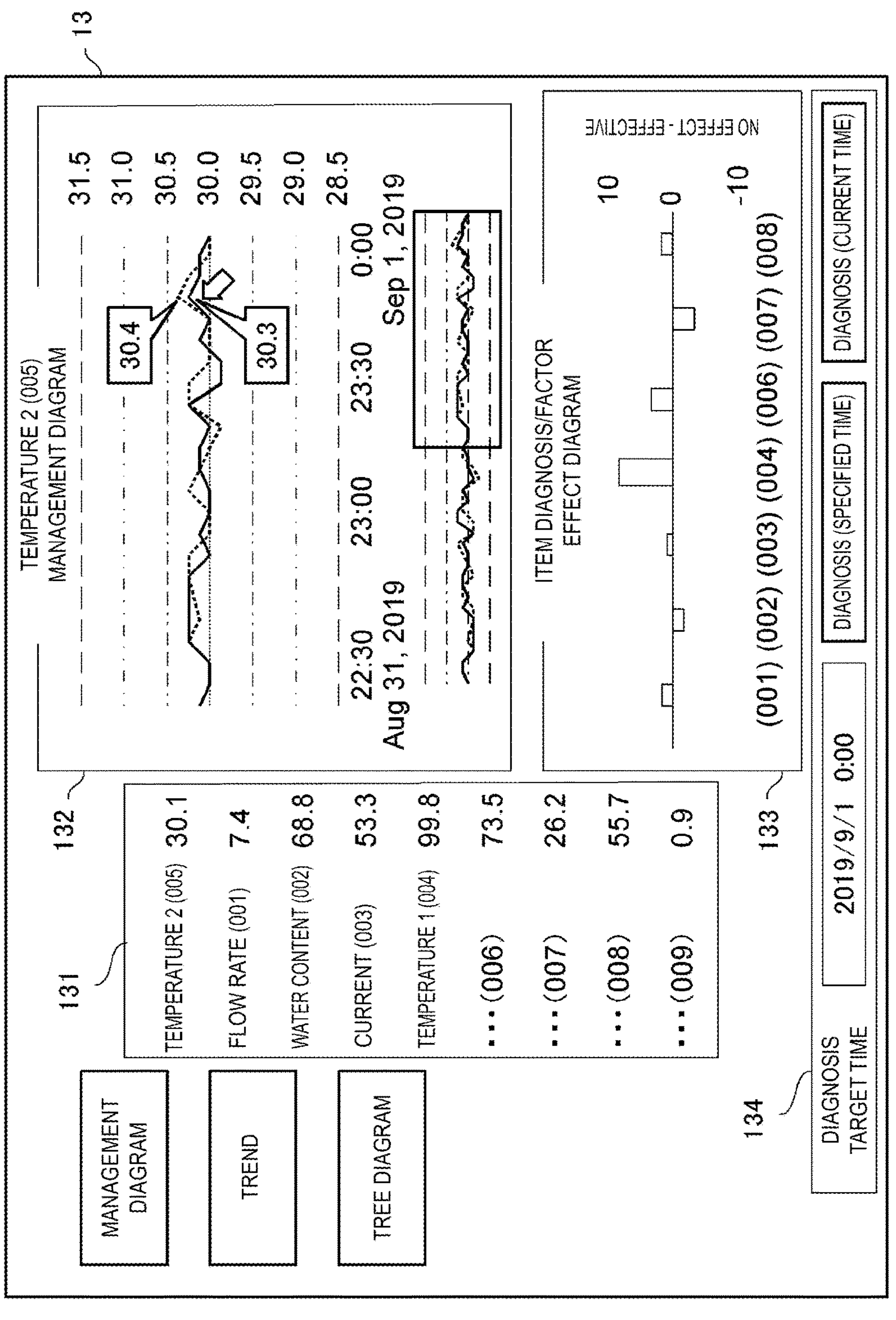
FIG. 19 is a diagram illustrating an example of a screen output to an input/output device.

FIG. 19 is a diagram illustrating an example of a screen output to the input/output device 13. FIG. 19 is an example of a main management diagram, in which transition of individual process data is shown in a line graph. A region 131 displayed on the input/output device 13 displays a plurality of combinations of identification information of the process data acquired from the plant 3 and the latest value. The management diagram of a region 132 shows the transition of values for specific process data in a line graph. Note that the vertical axis represents the value of the process data, and the horizontal axis represents the time axis. In addition, in the example of FIG. 19, the solid line represents a true value, and the dashed line represents an estimated value. Note that the true value may be the process data itself for which the abnormality degree is to be calculated, and the estimated value may be an estimated value by regression analysis of the process data for which the abnormality degree is to be calculated. The thin dashed lines represent the upper and lower limits of the normal range (in other words, threshold values for abnormality detection). Note that, as illustrated by balloons in FIG. 19, in a case where a user operates the input/output device 13 such as a pointing device to move a pointer onto the graph, a numerical value of the process data at the time point indicated by the pointer may be displayed. In a factor effect diagram of a region 133, a cause of irregularity of the process data displayed in the region 132 or a tag that can identify the cause is displayed on the horizontal axis, and the vertical axis represents the degree of satisfaction of the cause in a bar graph. It is shown that the greater the degree of satisfaction, the more likely the cause of irregularity of the process data. In addition, the cause diagnosis unit 145 calculates the degree of satisfaction based on the abnormality degree calculated by the abnormality determination unit 144 for an event serving as the assumed cause of irregularity of the process data. The user can recognize a candidate of the cause of the irregularity and an accuracy thereof based on the magnitude of the degree of satisfaction and can easily identify the cause of irregularity. In addition, in a case where a "diagnosis" button of a region 134 is pressed, the unit abnormality determination 144 calculates the abnormality degree at a specified time or the current time, and the factor effect diagram is displayed by the output control unit 146.

Then, in a case where the user operates the input/output device 13 such as a pointing device and selects any one of the bar graphs in the factor effect diagram, the cause of irregularity corresponding to the bar graph is highlighted in the logic tree.

Figure 20:
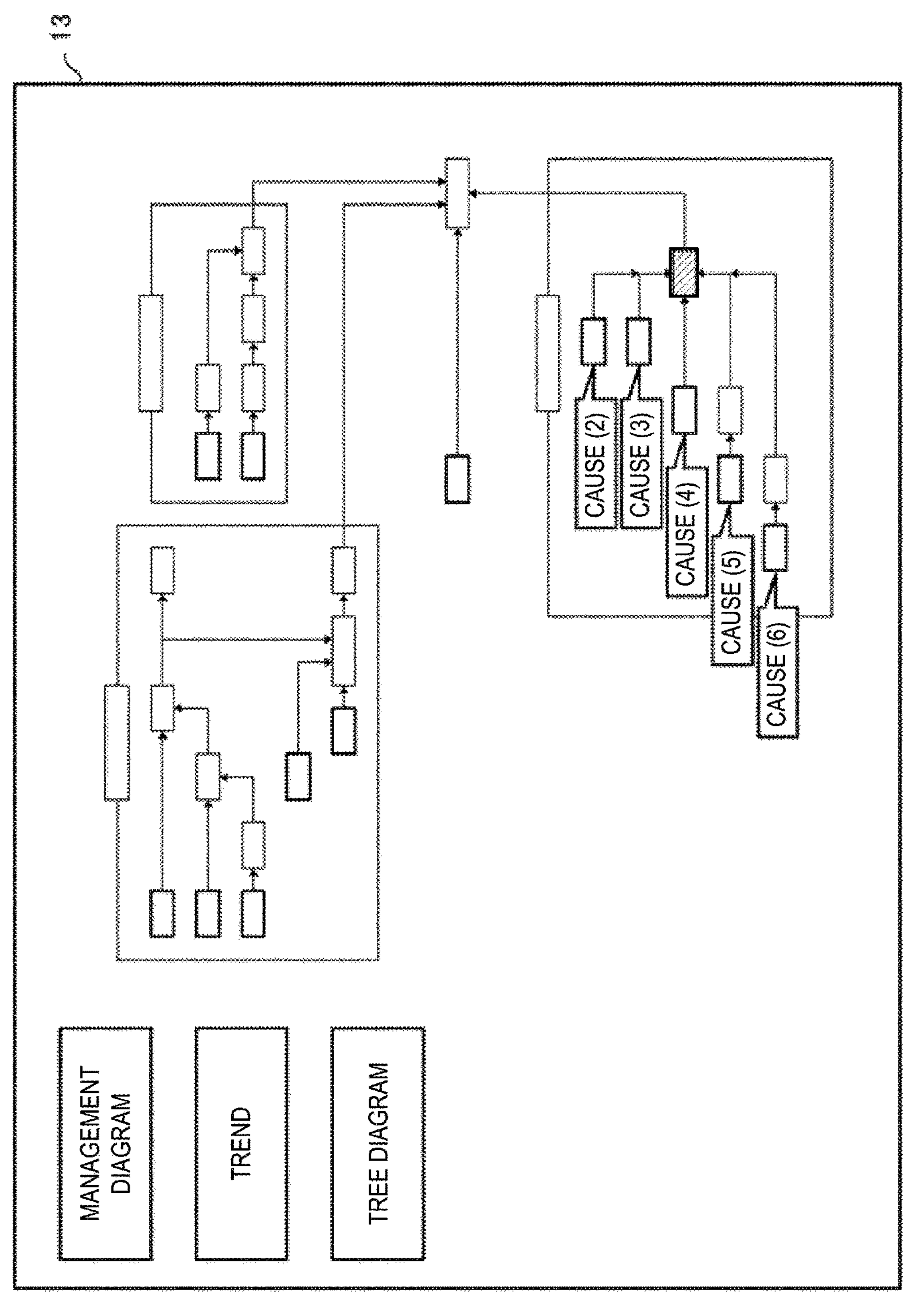
FIG. 20 is a diagram illustrating another example of the screen output to the input/output device.

FIG. 20 is a diagram illustrating another example of the screen output to the input/output device 13 by the output control unit 146. FIG. 20 is an example of the tree diagram, and a logic tree as illustrated in FIG. 10 is displayed. For example, in a case where a bar graph of the tag 004 is selected in FIG. 19, the influence corresponding to the process data of the tag 004 is highlighted on the logic tree. The highlighted display is made by change in the display mode, for example, change in color, change in the line type, or the like. In FIG. 20, a corresponding rectangle is hatched. Furthermore, the thick-line rectangles connected to the upstream of the logic tree represent the assumed causes of an influence. Each cause may be displayed as illustrated by a balloon in FIG. 20, or an influence on the process data other than the cause may be displayed. Note that the degree of satisfaction of each cause calculated in S32 in FIG. 18 may be further displayed, and an action may be further displayed. Alternatively, the cause may be displayed when a user moves a pointer onto each rectangle.

Note that in a case where a "trend" button illustrated in FIG. 19 and FIG. 20 is pressed, a process trend of each tag listed in the factor effect diagram may be displayed, and in particular, a process trend of a tag that can identify the cause of the irregularity may be displayed. In the process trend, values per periods of time, for example, per predetermined hours, per predetermined days, per predetermined months, or per season, are calculated by using the pieces of process data stored in the storage device 12 and are plotted on the graph.

Furthermore, the output control unit 146 may output a log of the abnormality degree at a timing when the abnormality degree calculated by each calculation method exceeds a predetermined threshold value, for example. Furthermore, the log of the assumed cause or the degree of satisfaction may be output. Each log can facilitate analysis of abnormal irregularity by associating and outputting a date and time, the product serial number, the calculation method, the abnormality detection model, and the like.

Variation

Each of the configurations, combinations thereof, and the like in each embodiment are an example, and various additions, omissions, substitutions, and other changes may be made as appropriate without departing from the spirit of the present invention. The present disclosure is not limited by the embodiments and is limited only by the claims. Each aspect disclosed in the present description can be combined with any other feature disclosed herein.

Furthermore, although the above embodiment has been described by taking a chemical plant as an example, it can be applied to a manufacturing process in a common production facility. For example, instead of the product serial number of the batch stage in the embodiment, a lot number can be used as a transaction, and the processing according to the batch stage in the embodiment may be applied.

At least some of the functions of the abnormal irregularity cause identifying device 1 may be implemented by being distributed in a plurality of devices, or the same function may be provided by a plurality of devices in parallel. Furthermore, at least some of the functions of the abnormal irregularity cause identifying device 1 may be provided on a so-called cloud.

Furthermore, the present disclosure includes a method and a computer program for performing the aforementioned processing, and a computer readable recording medium storing the program. The recording medium on which the program is stored enables the aforementioned processing by making a computer execute the program.

The computer readable recording medium refers to a recording medium that can accumulate information such as data or programs by electrical, magnetic, optical, mechanical, or chemical actions and can be read from a computer. Among such recording media, examples of recording media detachable from a computer include flexible disks, magneto-optical disks, optical disks, magnetic tapes, memory cards, and the like. Furthermore, as recording media fixed to a computer, there are HDD, Solid State Drive (SSD), ROM, and the like.

REFERENCE SIGNS LIST

1: Abnormal irregularity cause identifying device
11: Communication I/F
12: Storage device
13: Input/output device
14: Processor
141: Process data acquisition unit
142: Preprocessing unit
143: Learning processing unit
144: Abnormality determination unit
145: Cause diagnosis unit
10) 146: Output control unit
2: Control Station
3: Plant

The invention claimed is:

1. An abnormal irregularity cause identifying device comprising:

a processor configured to, read, from a storage device storing a plurality of types of pieces of process data continuously output by a plurality of sensors included in a production facility, the pieces of process data;

calculate an abnormality degree representing an extent of an irregularity of process data of the pieces of process data read in the step of reading the pieces of process data; and obtain accuracy of a cause of the irregularity based on a proportion of process data having the calculated abnormality degree satisfying a predetermined criterion in the plurality of types of pieces of process data, by using causal relation information defining a combination between the cause and the irregularity of each of the plurality of types of pieces of process data, the irregularity appearing as one or more influences resulting from each assumed cause, wherein the accuracy of the cause of the abnormality degree is determined based on a number of influences, resulting from the each assumed cause, that exceeds a threshold value, and wherein the abnormal irregularity cause in the production facility is identified based on the abnormality degree satisfying the predetermined criterion, in the process of obtaining the accuracy of a cause of an irregularity, the processor accesses a storage medium storing the causal relation information, in which the irregularity appearing as an influence is represented as a root, an assumed cause is represented as a leaf, and events that occur in the course from the cause to the irregularity are hierarchically represented in a tree format along a time series, and refers to the causal relation information, and the storage device stores an action representing a handling to be taken for the each assumed cause, such that a user follows the handling to be taken presented to the user determined from the calculated abnormality degree satisfying a predetermined criterion.

2. The abnormal irregularity cause identifying device according to claim 1, wherein in the step of obtaining accuracy, the processor multiplies each of the plurality of types of pieces of process data by a coefficient in accordance with a type of the process data or a coefficient based on a magnitude of the abnormality degree to obtain the accuracy of the cause of the irregularity.

3. The abnormal irregularity cause identifying device according to claim 1, wherein the processor is further configured to:

make an output device output, for the irregularity, a plurality of candidates of a possible cause of the irregularity and output accuracy of the possible cause.

4. The abnormal irregularity cause identifying device according to claim 2, wherein the processor is further configured to:

make an output device output, for the irregularity, a plurality of candidates of a possible cause of the irregularity and output accuracy of the possible cause.

5. An abnormal irregularity cause identifying method executed by a computer, the method comprising:

reading, from a storage device storing a plurality of types of pieces of process data continuously output by a plurality of sensors included in a production facility, the pieces of process data;

calculating an abnormality degree representing an extent of an irregularity of process data of the pieces of process data that is read; and obtaining accuracy of a cause of the irregularity based on a proportion of process data having the calculated abnormality degree satisfying a predetermined criterion in the plurality of types of pieces of process data, by using causal relation information defining a combination between the cause and the irregularity of each of the plurality of types of pieces of process data, the irregularity appearing as one or more influences resulting from each assumed cause, wherein the accuracy of the cause of the abnormality degree is determined based on a number of influences, resulting from the each assumed cause, that exceeds a threshold value, and wherein the abnormal irregularity cause in the production facility is identified based on the abnormality degree satisfying the predetermined criterion, in the process of obtaining the accuracy of a cause of an irregularity, the processor accesses a storage medium storing the causal relation information, in which the irregularity appearing as an influence is represented as a root, an assumed cause is represented as a leaf, and events that occur in the course from the cause to the irregularity are hierarchically represented in a tree format along a time series, and refers to the causal relation information, and the storage device stores an action representing a handling to be taken for the each assumed cause, such that a user follows the handling to be taken presented to the user determined from the calculated abnormality degree satisfying a predetermined criterion.

6. A non-transitory computer readable medium storing an abnormal irregularity cause identifying program causing a computer to perform:

reading, from a storage device storing a plurality of types of pieces of process data continuously output by a plurality of sensors included in a production facility, the pieces of process data;

calculating an abnormality degree representing an extent of an irregularity of process data of the pieces of process data that is read; and obtaining accuracy of a cause of the irregularity based on a proportion of process data having the calculated abnormality degree satisfying a predetermined criterion in the plurality of types of pieces of process data, by using causal relation information defining a combination between the cause and the irregularity of each of the plurality of types of pieces of process data, the irregularity appearing as one or more influences resulting from each assumed cause, wherein the accuracy of the cause of the abnormality degree is determined based on a number of influences, resulting from the each assumed cause, that exceeds a threshold value, and wherein the abnormal irregularity cause in the production facility is identified based on the abnormality degree satisfying the predetermined criterion, in the process of obtaining the accuracy of a cause of an irregularity, the processor accesses a storage medium storing the causal relation information, in which the irregularity appearing as an influence is represented as a root, an assumed cause is represented as a leaf, and events that occur in the course from the cause to the irregularity are hierarchically represented in a tree format along a time series, and refers to the causal relation information, and the storage device stores an action representing a handling to be taken for the each assumed cause, such that a user follows the handling to be taken presented to the user determined from the calculated abnormality degree satisfying a predetermined criterion.

* * * * *